United States Patent [19]
Gessalin

[11] Patent Number: 4,466,138
[45] Date of Patent: Aug. 21, 1984

[54] SAFETY HELMET WITH A SHELL INJECTED FROM THERMOPLASTICS AND METHOD FOR THE MANUFACTURE OF SAID HELMET

[75] Inventor: Jean Gessalin, Touquin, France

[73] Assignee: G.P.A. International, Chevry-Cossigny, France

[21] Appl. No.: 275,679

[22] Filed: Jun. 22, 1981

[30] Foreign Application Priority Data

Jun. 24, 1980 [FR] France ................................ 80 14041

[51] Int. Cl.³ .............................................. A42B 3/02
[52] U.S. Cl. ...................................... 2/243 R; 2/410; 2/192; 264/257
[58] Field of Search ............... 2/410, 243 R, 412, 425, 2/6, 10, 192; 264/257

[56] References Cited

U.S. PATENT DOCUMENTS

| | | | |
|---|---|---|---|
| 2,413,823 | 1/1947 | Gits | .................................. 264/257 |
| 4,288,268 | 9/1981 | Hartung | .............................. 2/412 X |
| 4,300,242 | 11/1981 | Nava | .................................... 2/412 |

*Primary Examiner*—Peter P. Nerbun
*Attorney, Agent, or Firm*—Frost & Jacobs

[57] ABSTRACT

The invention relates to a safety helmet having an injected thermoplastics shell, and the method for manufacturing the same. The helmet shell is of composite structure and includes a rigid insert of reinforced resin and an outer casing of injected thermoplastics molded onto the insert which is embedded within the mass of said outer casing and is prestressed by shoulders 5 and 6 provided on overlapping portions 3 and 4 of casing 2, after cooling of the same.

6 Claims, 6 Drawing Figures

SAFETY HELMET WITH A SHELL INJECTED FROM THERMOPLASTICS AND METHOD FOR THE MANUFACTURE OF SAID HELMET

The present invention relates to a safety helmet for a vehicle rider and a method for the production of said helmet.

The invention applies especially to helmets having an injected thermoplastics shell.

The manufacture of helmet shells by injection of thermoplastics provides many advantages as a result, in particular, of the accurateness of the parts obtained which, in most cases, require no additional finishing step such as trimming, machining or grinding.

Unfortunately, to exhibit sufficient impact strength, such shells of injected thermoplastics should have a large thickness, with a corresponding increase in their weight and cost.

On the other hand, there are known safety helmet shells which are made of reinforced resin with a glass fiber or other reinforcement, such reinforced shells providing with a reasonable thickness an excellent protection against impacts, but their manufacture requires several finishing steps, such as trimming and machining steps, which substantially lower the production rates and restrict automatization of the manufacture, thereby increasing the costs.

Thus, U.S. Pat. No. 2,413,823 discloses a method for manufacturing objects such as safety helmets, by injection of plastics onto an insert which is flexible, e.g. formed of a woven, felted or compacted fibrous element. Said insert constitutes a simple reinforcement of the plastics and, as a result of its flexibility, it is not stressed.

One object of the invention is therefore to provide a helmet with an injected thermoplastics shell which has the same protective properties as a conventional reinforced shell.

Another object of the invention is to manufacture a safety helmet without the finishing steps usually required by said reinforced shells and with all the advantages of injected members.

In a first aspect of the invention, a safety helmet includes an injected shell of thermoplastics provided internally with a rigid insert of reinforced resin, said insert having the shape of the shell itself and being both embedded in the injected mass of said shell and subjected to a hooping effect by the latter.

According to the invention, the shell of injected thermoplastics is directly molded onto the internal insert and overlaps the whole periphery of said insert.

In a further aspect of the invention, a method of manufacturing of such an helmet includes pre-manufacturing an insert of reinsorced resin, closely applying said insert against the male portion of a mold for the injection of the thermpolastic casing, arranging in a manner known per se said male portion covered by the insert in the female portion of the injection mold so as to provide between the internal surface of said mold and said insert a gap of a substantially constant thickness, injecting the thermpolastic resin into said gap so as to fill said gap and to mold the resin directly onto the insert, and removing the assembly from the mold after cooling and pre-stressing of the insert by the thermoplastic casing thus formed outside.

In an additional aspect of the invention, the insert of refinforced resin which is applied against the male portion of the injection mold is so secured to the later as to prevent any displacement at the time of injection.

In a further aspect of the invention, the insert is manufactured by arranging a bonnet on a dummy or mold, by thermally setting the edge of the bonnet so that it will retain its shape, and by impregnating the bonnet with a resin. Said resin is thereafter polymerized and removed from the mold.

The invention will now be described in more details with reference to a particular embodiment chosen by way of unlimiting example and shown in the appended drawings, wherein.

Figure 1:
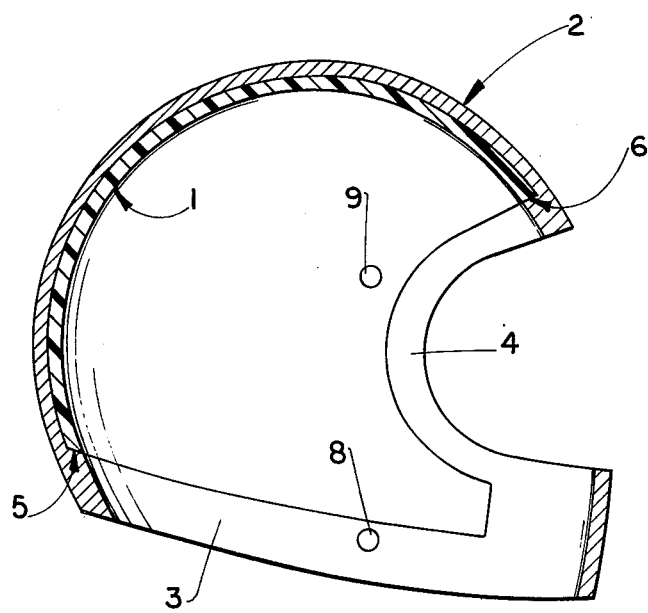
FIG. 1 is a longitudinal sectional view of a reinforced shell according to the invention.
Figure 2:
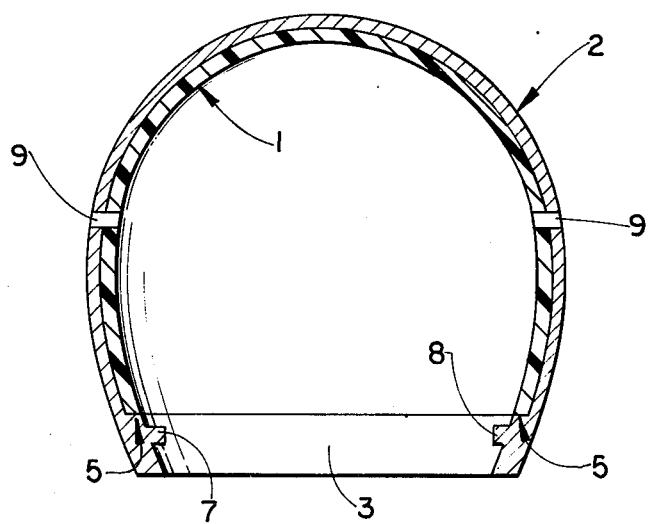
FIG. 2 is a cross-sectional view of the reinforced shell of FIG. 1.

Such as shown in FIGS. 1 and 2, the shell of the protector helmet according to the invention has a composite laminated structure and it essentially consists of a rigid reinforced resin insert 1 and an outer casing 2 of thermoplastics directly molded onto the insert 1 embedded in the thus obtained laminated shell.

The rigid insert 1 made of reinforced resin may be reinforced with glass fibers or any other fibers and in particular formed of a resin-covered canvas. Insert 1 has smaller dimensions than those of outer casing 2 and the later has protruding portions 3 and 4 at the bottom of the helmet and along the front opening thereof, respectively. Insert 1 is embedded into the injected mass of outer casing 2 and the projecting portions 3 and 4 of said outer casing 2 form all around insert 1 abutment shoulders 5 and 6, respectively, whereby insert 1 is retained within casing 2 by being set therein.

Apart from the fact that the direct molding of the outer casing 2 of thermoplastics onto the inner shell provides a bond between the insert and the casing, the connection therebetween is still improved by the fact that the injected thermoplastics shrink while cooling, this producing a hooping effect on the inner insert 1. This hooping effect of outer casing 22 on insert 1 provides prestressing of said insert which is kept captive along its edges by the peripheral shoulders 5 and 6 of the overlapping portions 3 and 4. The prestress produced in insert 1 assists stiffening of both said insert and the overall laminated shell.

Outer casing 2 made of thermpolastics is molded integrally with lateral protrusions 7 and 8 especially provided for securing, for instance, a chin-piece, a chin-strap and a vizor. Holes 9 through insert 1 and casing 2 may also be provided by molding, said holes being used for example for the pivotal connection of the helmet vizor (FIG. 2).

Figure 3:
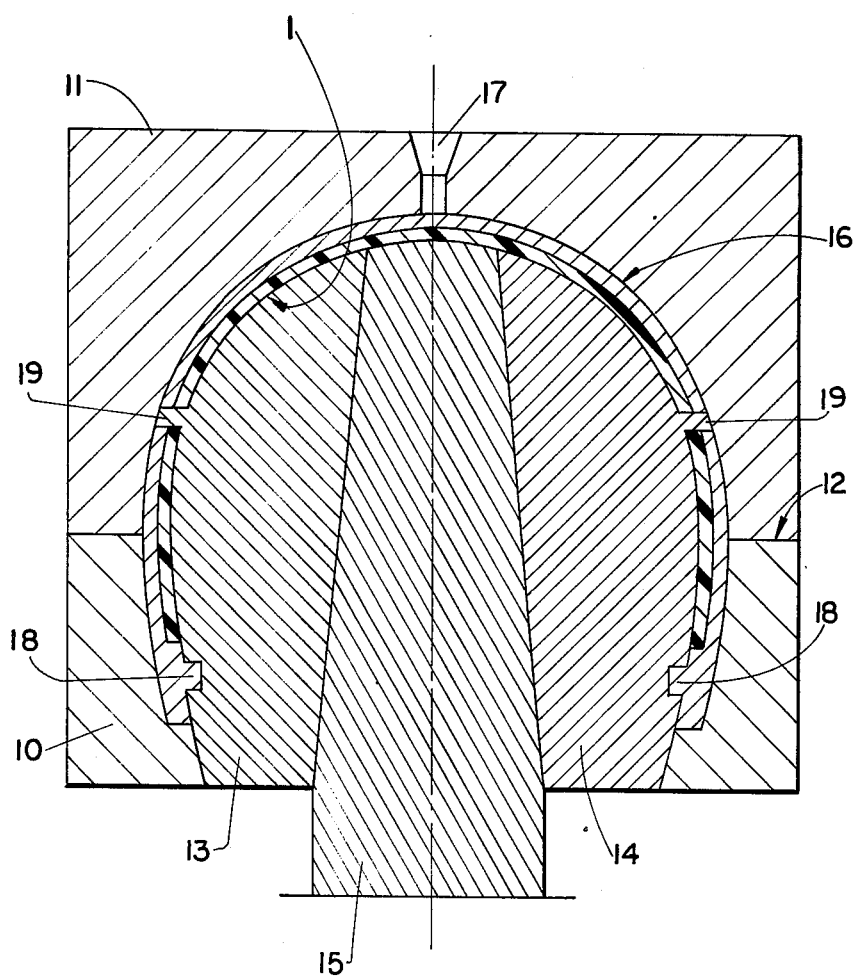
FIG. 3 is a cross-sectional view of an injection mold for the thermoplastic shell shown in FIGS. 1 and 2.

The reinforced shell described above is made by injection into a mold such as shown in cross-section in FIG. 3.

Said mold includes a female member in two parts 10 and 11 connected along a meeting plane 12 and a male member consisting of two side parts 13 and 14 and a central wedge-shaped part 15. When the various parts of the male and female members are brought together in operation, their respective convex and concave surfaces are matching and leave between them a gap 16 for receiving the insert 1 of the shell and to retain the thermoplastic resin, molded directly onto the insert. The upper part 11 of the female member has at its center a sprue 17 for injecting the thermoplastics while the side parts 13 and 14 of the male member have recesses 18 for shaping the protruding portions projecting into shell 2, said side parts 13 and 14 having moreover studs 19 for securing insert 1 against movement on the male member and also for providing in the injected shell said holes 9 for pivotal connection of the vizor.

Before describing the use of the above mold, the manufacture of insert 1 will be considered, since said insert, which may be manufactured by a conventional method, is initially disposed in the mold.

Figure 4:
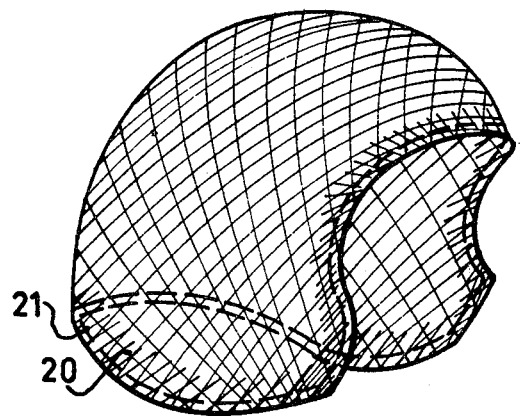
FIG. 4 is a view in perspective of an insert used for manufacturing a helmet according to the invention.

The insert is advantageously formed with a textile reinforcement impregnated with a thermosetting resin (such as polyester, epoxy, etc.). The textile reinforcement is advantageously integral, preferably, a jersey bonnet such as shown in FIG. 4 yet having a shape. The type of the yarn used for manufacturing the bonnet depends on the required mechanical performance. Use may be made of glass, "Aramid", carbon fibers or others. It is advantageous to make this bonnet to the shape required for the insert. It is found that, when such a bonnet is placed on the male member of a mold, for example, its edges will tend to roll up. It is therefore preferable for the edge 20 of the bonnet to be made from thermpolastics yarns, e.g. polyamid. When the bonnet is placed on the male member, a weld line 21 (FIG. 4) is formed, by ultrasonic or high-frequency heating, to cause the selvedge yarns to bind together and constitute a semi-rigid skeleton preventing the bonnet bottom from rolling up. The thus treated bonnet will retain its shape without trouble when placed on a mold male dummy before impregnation.

Figure 5:
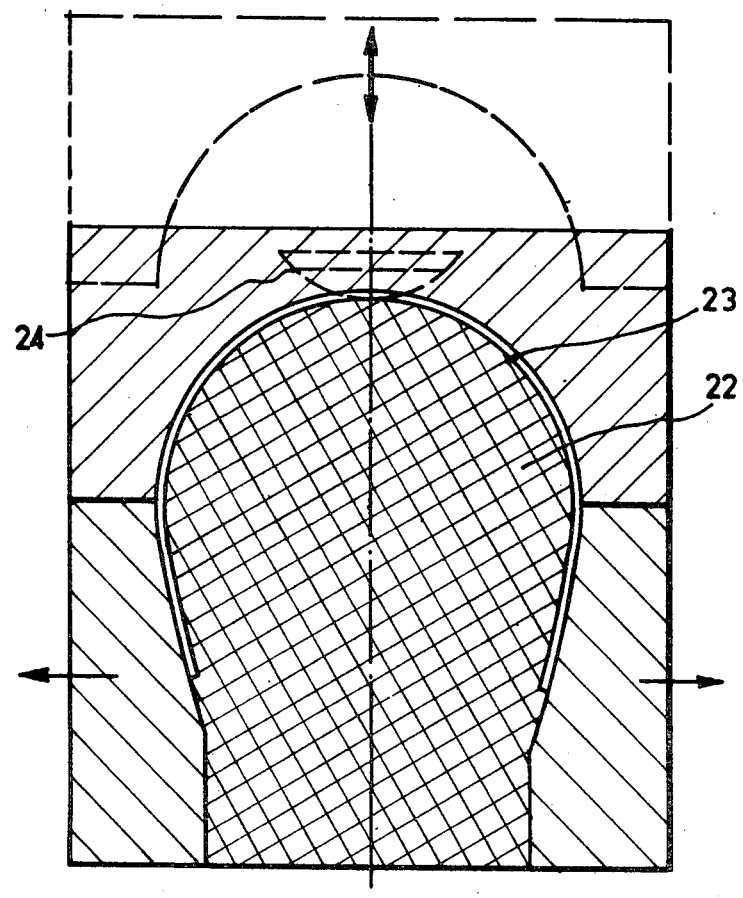
FIG. 5 is a sectional view of a mold for manufacturing an insert.

An alternative method for producing the insert will now be considered. FIG. 5 shows another mold for producing the insert which is quite similar to that used for the molding of thermoplastics, as previously described. It should however be noted that the cavity 23 of the female member matches the external dimensions of the insert. The mold has no injection-hole corresponding to hole 17 of FIG. 3. The male member is integral. The mold may be heated to a controlled temperature corresponding to the curing temperature of the resin.

The mold is disposed on a vertical press. Before closing the mold, the required amount of resin, which may for example be placed in a cup 24 of glass fiber fabric or other, is placed on the top of the male member. When the mold is closed, said resin runs over the bonnet and permeates the same while the textile cup becomes incorporated in the workpiece. It will be understood that this method of permeation is merely illustrative, as methods well known in the art may also by used.

The insert may be easily removed from the integral male member since, at the time of stripping, it remains flexible and deformable since it is still at a relatively high temperature.

These methods for manufacturing the insert require only a short contact time. They provide excellent mechanical properties since they do not require ovelapping or connecting fabrics. The polymerizing or curing process can be well controlled by temperature and time adjustement, and there occurs no bubble. The resulting thickness is always the same and this feature is most important for the subsequent obtention of reliable molding of thermpolastics. The insert obtained has a shape in perfect contact with the male mamber of the mold. There is even obtained a good external finish whereby the subsequent molding step is facilited.

However, it is found that, for the same weight of textile material, a jersey reinforcement will afford better mechanical properties than a woven reinforcement.

Figure 6:
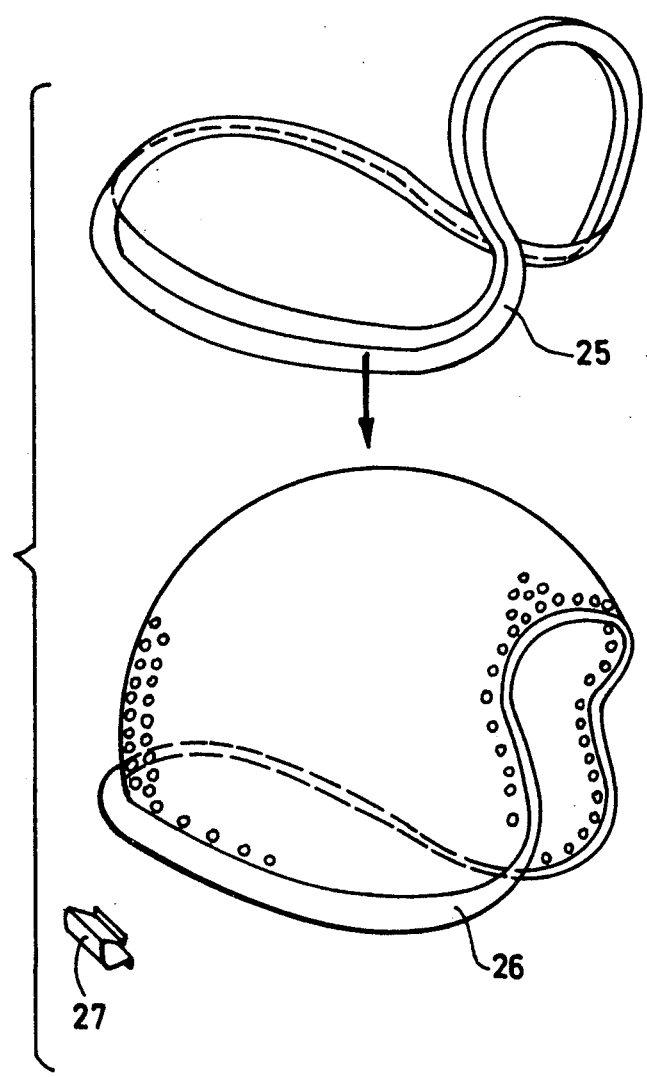
FIG. 6 is an exploded view in perspective of a dummy used for manufacturing an insert.

However, the insert can be produced by using a simpler method. As shown in FIG. 6, a dummy having a rigid casing corrsponding in shape to the male member 22 of the insert mold may be used. The casing is apertured and has a flange 26. A mask 25 fits against flange 26 whereon it may be retained by clips 27.

During the manufacture of the insert, a piece of flat cut jersey is disposed on the dummy. Since the jersey is a knitted fabric, it is highly deformable and will assume the dummy configuration without wrinkling. It is then retained by setting the mask 25 and clips 27 in position.

The jersey stretched onto the dummy is then sprinkled with a resin emulsified in water or is immersed in a bath thereof. After drying in an oven, the jersey retains its shape sufficiently for being directly used. Of course, the projecting portions are trimmed so that the part meets the dimensional requirements.

The thus obtained preform can be placed on the male member 22 (FIG. 5) of the insert mold.

The emulsified resin used for stiffening the jersey may be an emulsion of polyester in water, providing sizing of the yarns without filling the gaps therebetween so that the resin permeates satisfactorily the jersey during manufacture of the insert.

Reference will now be had to the manufacture of the reinforced shell by means of the mold described with reference to FIG. 3.

Insert 1, corresponding to the final shape of the shell to be produced, is mounted on the male member of an injection mold, by first inserting the two side parts 13 and 14 into insert 1 and by introducing studs 19 in holes previously provided in said insert, then by driving the wedge-shaped central part 15 between said two side parts 13, 14. A good result requires that the insert perfectly fits the mold male member and so prevents penetration of the injected thermoplastics between the male member and the insert. Of course, said insert should be of a substantially constant thickness so that the gap left within the mold for the injection of thermoplastics be also of substantially constant thickness. Finally, the insert should have such an external surface finish as to allow perfect mechanical anchoring of the injected thermoplastic material while not impeding the flow of said material when the same enters the mold.

The assembly formed by the male member covered with insert 1 is thereafter introduced into the internal cavity of part 11 of the injection mold, then part 10 of said mold is in turn mounted so as to perfectly fit onto part 11 along the meeting plane 12 and also along the male member bottom so as to provide a good seal.

A flowing thermoplastic resin is subsequently injected through spout 17 in the gap 16 left between insert 1 and the complementary concave wall of the mold cavity.

The injected thermoplastics is directly molded onto insert 1 and its shrinkage during cooling provides a hooping effect on said insert.

After curing of the thermoplastics within the mold, part 10 of the female member, insert 1 and the thermoplastics casing molded onto the latter are removed from the cavity of part 11. Thereafter, removing the central wedge-shaped part of the male member allows the two lateral parts 13 and 14 to be drawn together and withdrawn from the resulting reinforced thermoplastic shell.

Since the insert is so designed that when it is located within the casing, its edge is shifted internally with respect to the edge of the completed shell, it is embedded within the injected mass and its periphery abuts against thermoplastics casing, so that, when said casing cools and begins to shrink, a buttressing effect is applied to the insert which is thereby strongly pushed against the concave inner surface of the outer casing 2, this buttressing effect ensuring hooping of the insert within said thermoplastics casing.

As a result of the prestress thus impart to the elements of said shell, the latter has better protective properties than a conventional laminated shell wherein the components do not exert any mutual hooping effect. Moreover, the shell according to the invention permits to use the previously described method which allows an automatic manufacture providing both a considerable reduction of the manufacturing costs, especially because the finishing steps are suppressed, and also outstanding evenness and consistency in quality, especially because the perfect bonding provided between the insert and the outer casing.

It will be understood that the scope of the invention is not limited to the single embodiment described above by way of illustrative but unlimiting example, but also extends to any alternative embodiments merely differing therefrom by constructional details.

I claim:

1. A safety helmet, especially for a vehicle rider, including a shell having an injected thermoplastics outer casing provided internally with a rigid insert of high strength reinforced resin having the shape of the shell itself, said insert being surrounded by the injected mass of said outer casing and prestressed by a hooping effect exerted by said casing.

2. A helmet as claimed in claim 1, wherein the casing of thermoplastics is directly molded onto the inner insert and includes portions overlapping the whole periphery of said insert.

3. Helmet as claimed in claim 1 or in claim 2, wherein the outer thermoplastics casing includes along its edge internal abutment shoulders bearing against the periphery of said insert which is thereby retained within said shell by being set therein.

4. A method for manufacturing a helmet including a shell having an injected thermoplastics outer casing provided internally with a rigid insert of reinforced resin, including the steps of premanufacturing a rigid insert of high strength reinforced resin, providing an injection mold having a male member and a female member defining a cavity having the shape of the shell, closely applying said insert onto the male member of said injection mold, disposing in a manner known per se said male member covered with said insert in said female member so as to provide between the internal surface of female member and said insert a gap having a substantially constant thickness, injecting said thermoplastics into said gap so as to fill the same and to mold said resin directly onto said insert, and removing the assembly from said mold subsequent to cooling of thermoplastics, whereby said insert is prestressed by the thermoplastics casing formed around said rigid insert.

5. A method as claimed in claim 4, wherein said insert is secured on said male member of the injection mold before disposing said assembly into said female member and effecting the injecting step.

6. A method as claimed in claim 4 or in claim 5, wherein said insert is premanufactured by providing a mold, arranging a bonnet on said mold, thermally setting the bonnet edge so that it retains its shape, and permeating the bonnet with a resin.

* * * * *